Sept. 8, 1925.  1,552,752
F. E. MAYNARD
COMBINED SPOTLIGHT AND WINDSHIELD
Filed June 2, 1923   2 Sheets-Sheet 1
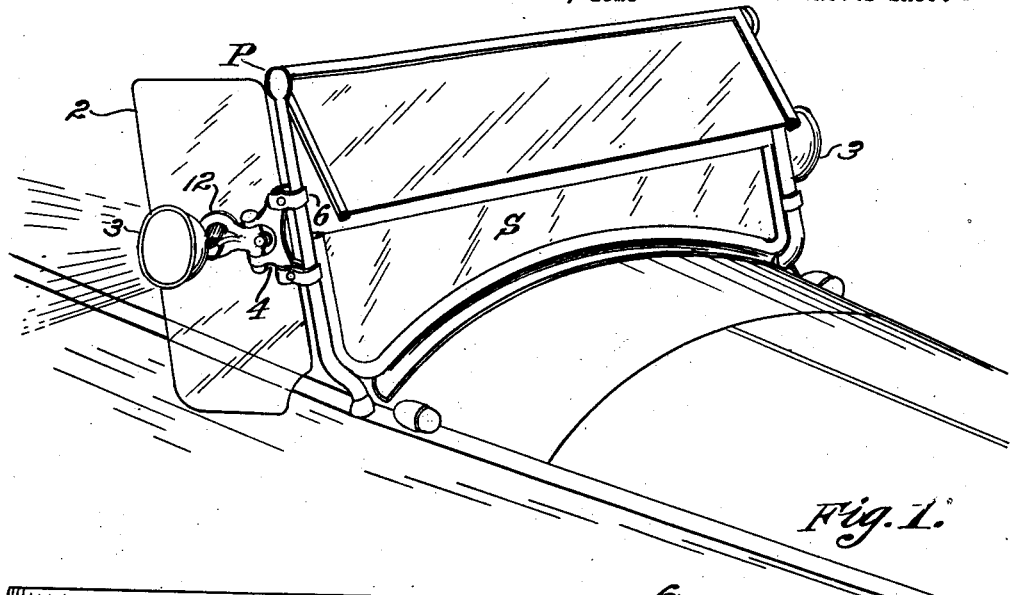
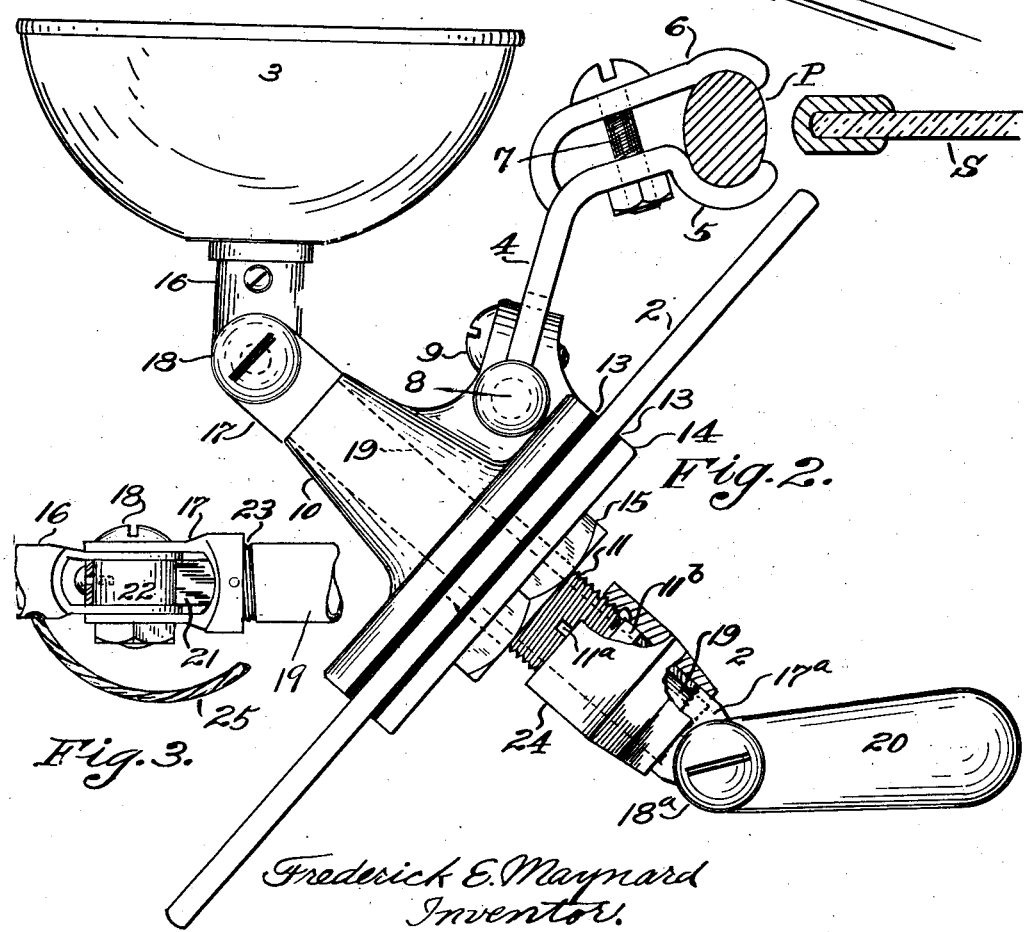

Sept. 8, 1925.　　　　　　　　　　　　　　　1,552,752
F. E. MAYNARD
COMBINED SPOTLIGHT AND WINDSHIELD
Filed June 2, 1923　　　　　2 Sheets-Sheet 2
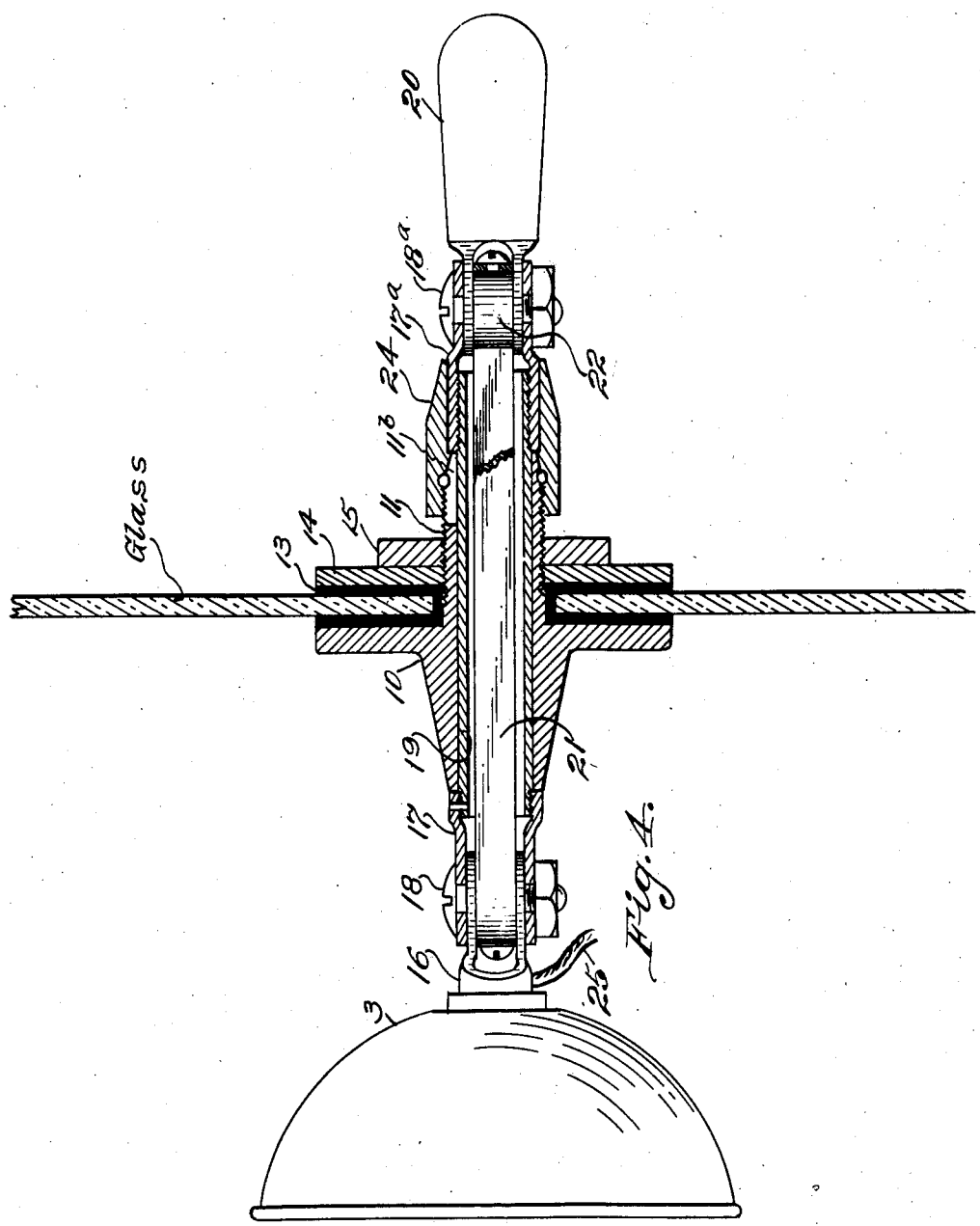

Patented Sept. 8, 1925.

1,552,752

UNITED STATES PATENT OFFICE.

FREDERICK E. MAYNARD, OF LOS ANGELES, CALIFORNIA.

COMBINED SPOTLIGHT AND WINDSHIELD.

Application filed June 2, 1923. Serial No. 643,052.

*To all whom it may concern:*

Be it known that I, FREDERICK E. MAYNARD, a citizen of the United States, residing at Los Angeles, in the county of Los Angeles and State of California, have invented new and useful Improvements in a Combined Spotlight and Windshield, of which the following is a specification.

This invention relates to automobile accessories, and especially to spot light and side wind wing supports.

It is the broad object of my present invention to provide a bracket structure for supporting a spot light in front of a glass windshield element wholly without any support for the spot light being provided by the glass of the windshield. In other words, an object of the invention is to provide a combined spot light and windshield supporting means which supports the spot light independently of the glass of the windshield.

Another object is to provide a bracket for holding a spot light in front of a windshield in such manner that the spot light may be turned to various positions by manipulation of a handle behind the windshield without any strain being imposed on the windshield glass.

Other objects and advantages will be made manifest in the following description of an embodiment of the invention shown in the accompanying drawings, wherein:

Figure 1 is a perspective of the device.

Fig. 2 is a plan, parts being in section.

Fig. 3 is a sectional detail of a swivel joint.

Fig. 4 is a longitudinal section of the bracket, the spot light and the handle being aligned.

Side wind wings —2— are now a nearly universally used accessory on open automobiles, and spot lights —3— are as extensively used on open and closed cars.

I am fully aware that spot lights have been mounted in front of and wholly supported in glass (front) wind shields, and have handles behind the shields to swing the spot light. This may be convenient for closed cars, not requiring wind (side) wings.

This invention includes a bracket structure having the dual function of supporting a side wing and supporting also a spot light.

The broad object of my invention is to meet and fill the requirement for a single bracket supporting a wind wing —2— and supporting a spot light in front of the wing, and providing for operation of the spot light by a handle behind the wing —2—.

The embodiment shown includes a bracket —4— having clamping seats —5—6— clinching on the usual wind shield post —P—. Between the posts is the usual front shield —S—. A screw 7 closes the clamps. The bracket —4— has a pivot pin —8—, and turnably clamped on this, by a bolt or screw —9—, is a fixture having a tubular body —10—, a hub portion —11— of which is turned down and threaded. The body —10— has an extended abutment or flange —12— of suitable area and form to provide a firm rest for the wind wing —2—, which is perforated to receive the threaded hub —11—.

On each side of the glass wing —2— is placed a cushioning washer —13—, compressed upon the glass by a flat ring nut —14— screwed up on the hub 11. A lock nut —15— jambs nut —14—.

The spot light —3— has a connection —16— pivoted in a clamp head —17— by screw —18—. The head —17— is provided on one end of a round tube —19—, turnably fitting in the body —10—; the axis of the screw —18— being at right angles to the tube —19—. This tube has on its rear end a head —17ª—, having a pivot screw —18ª—, and to which is attached a handle —20—. The screws —18—18ª— are parallel on axes perpendicular to and intersecting the axis of the body —10—.

The handle —20— forms means, at the rear of the wing —2—, by which the spot light can be swung universally on the body —10— and in front of the wing.

Many forms of operating connections between the handle and the spot light may be employed. This is a detail only of embodiment. As shown, a belt —21— passes through the tube 19, and is attached to the connector part —16— of the spot light. The belt also attaches to the handle —20—. The belt as shown is attached to hubs —22— forming rigid members of the swinging parts —16—20—.

Right and left hand threads —23— on the tube —19— provide for tensioning of the belt.

The screws —18—18ᵃ— provide for frictional resistance to prevent play of the handle and spot light on their pivots.

The tube —19— is adapted to turn in body —10— and thus sweep the spot light in an orbit about the axis of the body —10—, while at the same time the spot light can be swung on the axis of its pivot screw —18—.

Frictional control of the tube —19— to prevent play is provided by a chuck collar —24— engaging the rear end of the hub —11—; this being split at —11ᵃ— and also tapered at —11ᵇ—. The chuck collar —24— is conically bored and thus jambs the split hub end —11— on the rotatable tube —19— with a holding pressure, but allows the tube to be rotated by the handle —20—. The chuck collar is shown as telescoping over the near swivel head —17ᵃ— to form a neat structure.

Any suitable electric circuit —25— may be connected up to the spot light bulb.

Obviously, this specification does not set forth all of the uses to which the invention may be applied, nor does it show all the various forms, modifications and adaptations which may be resorted to in embodying the invention in actual construction or use, as conditions may require, and the right is especially reserved to vary, modify and adapt the invention and the details thereof within the spirit of the invention.

What is claimed is:

1. A bracket for spot lights and side wind wings, including means to clamp on a primary support, a tubular element attached to said clamp means and adapted to receive and extend through the wind wing, a tube journaled in said element, and a spot light pivoted on the front end of the tube.

2. In combination, a bracket including a tubular part, a side wind wing through which the said part extends, means for fastening the wing on said part, means for attaching the said part to a primary support, and a spot light device comprising a lamp and a controlling handle supported in the said part so that the lamp of the device is positioned in front of the side wind wing and its controlling handle is disposed in the rear of the side wind wing.

3. In combination, a spot light lamp, a tube on one end and the axis of which the spot light is pivotally mounted, a bracket having a tubular part to be mounted in a perforation in a vehicle windshield, said tube rotatively bearing in said part, means for clamping the bracket part upon the windshield, a handle pivoted on the other end and axis of the tube so as to swing from one side to the other thereof, and means in said tube operatively connecting the lamp and said handle.

4. In combination, a spot light, a bracket attachable to a primary support, a tube passing through the bracket and on which the spot light is pivoted, a wind wing mounted on said bracket and in the rear of the spot light, and handle means in the rear of the wind wing for oscillating the spot light, the spot light being supported wholly independently of the wind wing.

5. A bracket means attachable to a primary support, a wind wing supported by said bracket, a spot light supported by the bracket and being disposed in front of the wind wing, a tube journaled in the bracket and having a pivoted operating handle, and means connecting the handle and the spot light.

6. A bracket, a wind wing on said bracket, a spot light pivoted adjacent the front end of the bracket, the bracket forming the single support for the spot light and the wind wing and a handle pivoted behind the wind wing and being connected through the said wing to the spot light.

7. An organized, automobile accessory comprising a bracket, a tube mounted in the bracket, a spot light supported by the tube in front of the bracket, and a wind wing supported by the bracket behind the spot light, the latter being attachable to the usual side post of an automobile wind shield and a handle for turning the tube in the bracket and for swinging the spot light as to the tube.

8. An organized, automobile accessory comprising a bracket attachable to a part of an automobile, a perforated wind wing mounted on the bracket, a tube passing through the wing and the bracket, a spot light supported on the tube in front of the bracket and in front of the wind wing, and having a handle in the rear of the wind wing, and means in the tube connected to and by which the spot light is manipulated.

9. A spot light device including a body having a tubular part to be clamped in a windshield, a tube journaled in said part, pivots mounted parallel on a common plane and diametrically on each end of the tube, a spot light lamp attached to one pivot so as to be set coaxial with the tube, a handle attached to the other pivot, and means, in the tube, connecting said lamp and the handle whereby the lamp may be swept around the front end of the tube and the tube rotated.

10. A spot light bracket structure including a tubular body portion adapted to be clamped in an aperture in a wind shield of a vehicle and forming a supporting bearing, a spot light lamp at the front end of said structure body and a handle at the rear end of the body, a carrying device rotatively mounted in the said body portion substantially without end play, parallel pivots disposed diametrically on the ends of said device and on which pivots said lamp and handle are directly mounted so that each can swing around the end of said device in any plane along the axis of the supporting body portion, and means extending through said portion and operatively connecting said lamp and said handle; the latter forming means with the carrying device whereby the lamp can be swept in a circle around the axis of the bearing, body portion, and by which handle the lamp can be swung in an arc of 180 degrees around the end of the rotative carrying device and its bearing portion.

In testimony whereof I have signed my name to this specification.

FREDERICK E. MAYNARD.